United States Patent [19]

Lucas

[11] Patent Number: 4,549,701

[45] Date of Patent: Oct. 29, 1985

[54] WEB TENSION LOAD CELL

[75] Inventor: Robert G. Lucas, Janesville, Wis.

[73] Assignee: Beloit Corporation, Beloit, Wis.

[21] Appl. No.: 562,005

[22] Filed: Dec. 16, 1983

[51] Int. Cl.⁴ .............................................. B65H 23/16

[52] U.S. Cl. .................................. 242/75.3; 73/862.48

[58] Field of Search .................. 242/75.3, 75.1, 75.44, 242/75.51, 75.2, 154, 155 R; 73/862.48, 862.47, 862.45; 254/273; 226/44, 45, 195

[56] References Cited

U.S. PATENT DOCUMENTS

| | | | |
|---|---|---|---|
| 3,031,152 | 4/1962 | Cohen et al. | 73/862.48 |
| 3,870,214 | 3/1975 | Schmid | 226/44 |
| 3,950,988 | 4/1976 | Nowisch et al. | 73/862.45 |
| 4,052,891 | 10/1977 | Bartlett | 73/862.48 |
| 4,171,639 | 10/1979 | Simon | 73/862.55 X |
| 4,233,837 | 11/1980 | Canfield | 73/862.48 |
| 4,326,424 | 4/1982 | Koenig | 73/862.48 |
| 4,417,516 | 11/1983 | Fischer | 242/75.3 X |

FOREIGN PATENT DOCUMENTS

| | | | |
|---|---|---|---|
| 2117477 | 12/1971 | Fed. Rep. of Germany | 73/862.48 |

*Primary Examiner*—Stephen Marcus
*Assistant Examiner*—Leo James Peters
*Attorney, Agent, or Firm*—Hill, Van Santen, Steadman & Simpson

[57] ABSTRACT

A web tension load cell for a paper mill and the like wherein the load cell is mounted in a member which can flex due to a metal flexture point that eliminates mechanical back lash such as occur with ball or roller bearings. As the load on a roller varies flexture will occur at the metal flexture point which will transfer a load onto the load cell which is detected and converted into a signal for controlling a tension control that varies the tension on the roller. Top and bottom plates and the load cell are designed so as to maximize the structural stiffness to optimize the mechanical stiffness and mechanical vibration frequencies of high speed winders utilized in paper mills.

4 Claims, 4 Drawing Figures

TENSION CONTROL
ANALOG CONVERTER
DIGITAL CONVERTER
DIGITAL FILTER 24a
11
24
12
22c
36a
34a
34b
36b
22d
18
36
43
34
90
22a
23a
23
22
21a
21
14a
14

24
32
33
26
31
49
22c
47
46
44
42
43
48
91
39
41
34
θ
37
36
38
51
90
53
52
54
18
12
11
22
23
21
19
16
14
13

WEB TENSION LOAD CELL

BACKGROUND OF THE INVENTION

1. Field of the Invention

This invention relates in general to tension controls for paper or other webs and in particular to an improved tension and control which accurately senses the load on a moving web and controls the applied tension with such signal.

2. Description of the Prior Art

With high speed winders for paper and other materials, it is necessary to accurately control the tension so as to prevent tearing or the forming of rolls which are too loose so the load on bearing supporting rollers must be measured. Measurement of such loads has been difficult in the environment due to the vibration and impact loading.

SUMMARY OF THE INVENTION

It is an object of the present invention to provide a web tension control which includes an electronic load cell which is mounted so as to eliminate mechanical vibration problems. The strain gauge load cell is mounted so that it accurately measures the load on a bearing so as to control the tension of a moving web and also to eliminate mechanical vibrations which exist in such environment.

The speed of present day high speed winders are limited due to the ability to accurately sense the web tension. The high frequency forcing functions are too high to be mechanically suitable for commercially available cells, and the present invention provides for mounting a tension load cell with a hinged pivoted arrangement that measures the summation of moments about a pivot point. The force measured is used to indicate and to control the process web tension in the winder. A force cell which has high mechanical spring stiffness is utilized and top and bottom plates are of design proportions so as to maximize within packaging constraints the structural stiffness to optimize the mechanical stiffness and mechanical vibration frequencies of high speed winders.

The cell is pivoted so that by using a metal flexture point without mechanical back lash which occurs with ball or roller bearings of the prior art are eliminated.

The present invention is designed to handle accumulative fatigue effects of repeated web snap-offs which result from a slack web and sudden impact loading. Generally the tensile strength of the web is about six times the total operating tension and no matter what the rate of loading the total impact energy that has to be absorbed by the cell is the same.

The cell is oversized and the strain gauge output signals are low. The low level analog strain gauge output signal can be converted to a digital signal with very high resolution such as about 200,000 increments per full scale cell output. This tension signal can be digitally filtered and reconverted to a useable 4–20 milliamp analog signal to control the tension control.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
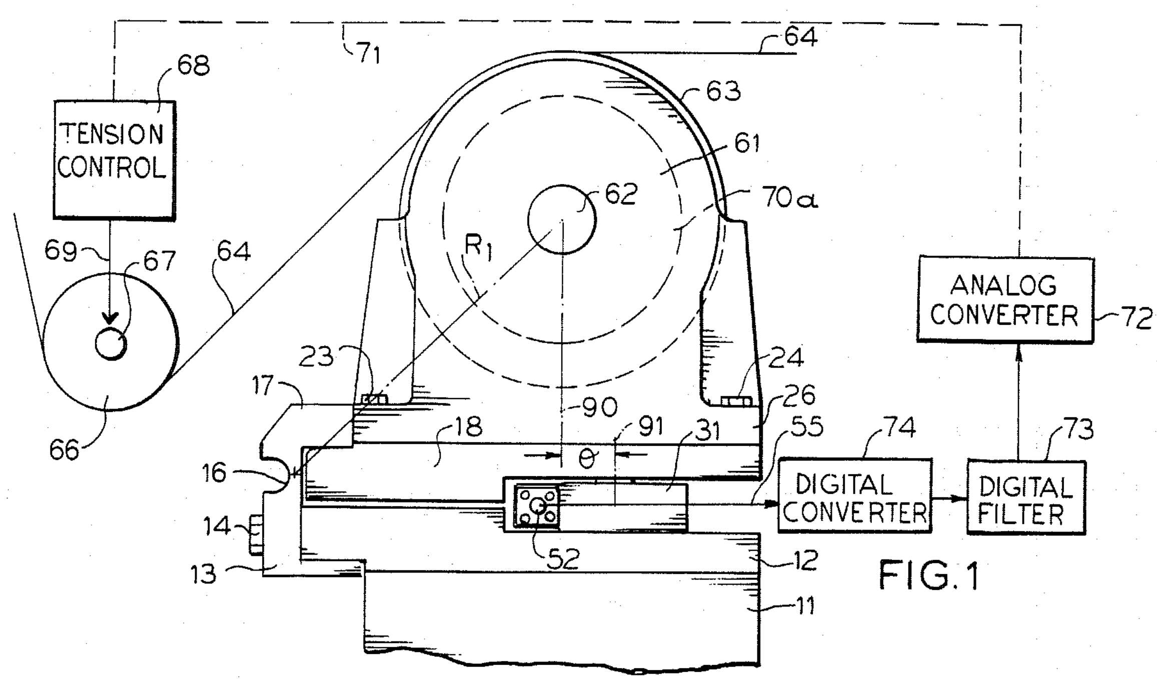
FIG. 1 is an end view illustrating the invention.
Figure 2:
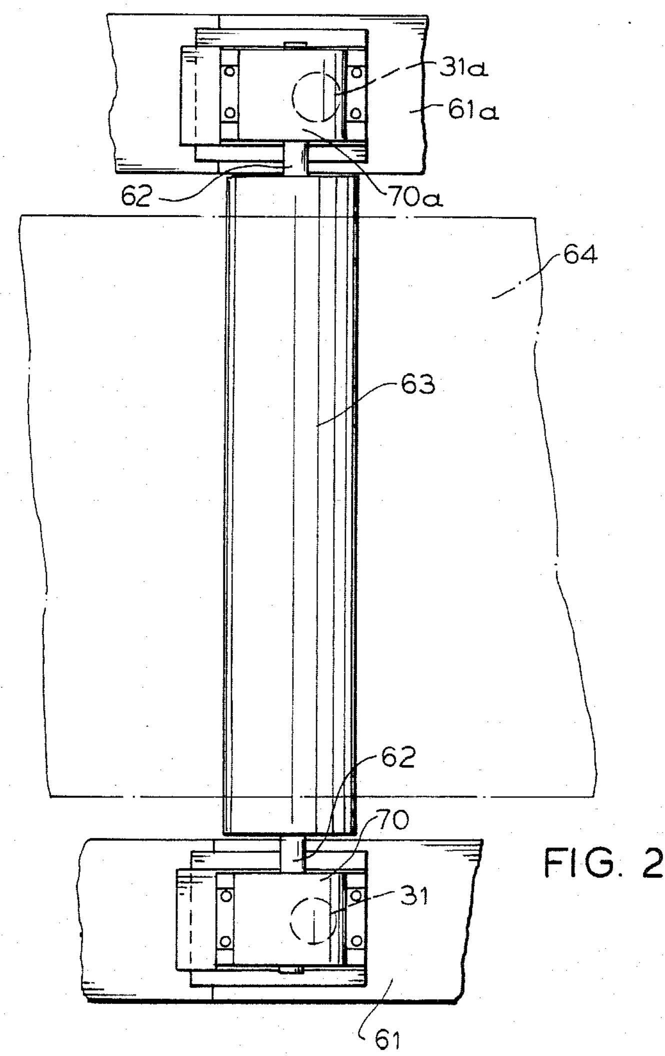
FIG. 2 is a top view illustrating the invention.
Figure 4:
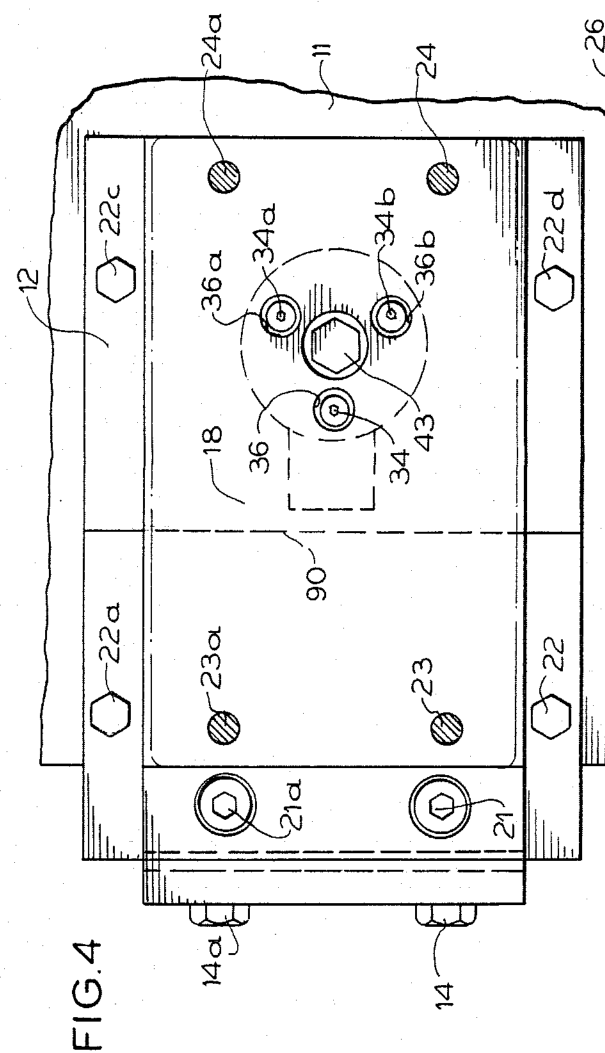
FIG. 4 is an enlarged detail illustrating the output terminal for the load cell.
Figure 3:
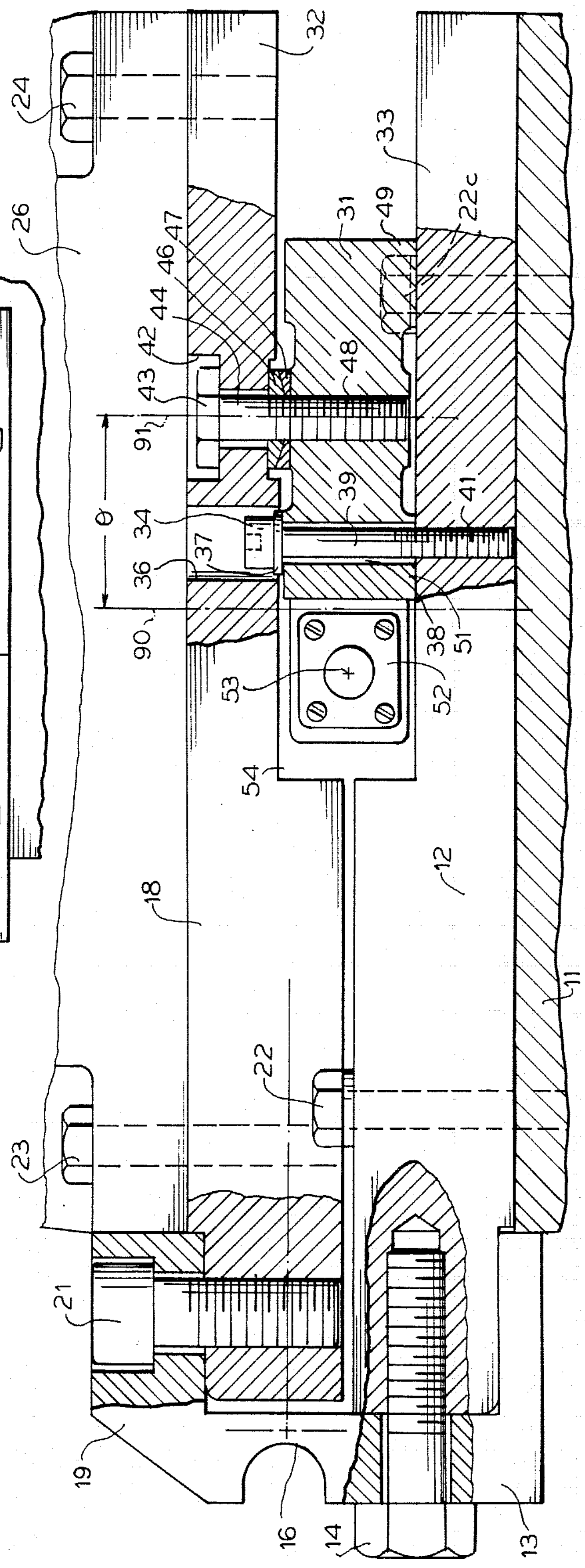
FIG. 3 is an enlarged partially sectional view illustrating the invention.

FIGS. 1 and 2 illustrate a web 64 such as paper which passes over a roller 63 which is supported on a shaft 62 and mounted at opposite ends in bearings 70 and **70*a*. The bearings 70 and 70*a* are supported in frame members 61 and 61*a* which have flange portions 26 at their lower ends. The support members 61 and 61*a* are supported on load cells 31 and 31*a* in the following manner. The flanges 26 of the supports 61 and 61*a* each rest on bearing plates 18 which are attached to the members 61 and 61*a* by bolts such as bolts 23 and 24 and the bearing plates 18 are connected to a pivotal portion 19 as by bolts 21 and 21*a* as illustrated in FIGS. 3 and 4. A member 19 is formed with a cutout portion 16 so as to allow pivoting at such point and a lower portion 13 of the member 19 is connected by bolts 14 and 14*a* to a bottom support plate 12 which is attached to the frame 11 by bolts 22, 22*a*, 22*c* and 22*d* as illustrated in FIGS. 3 and 4** for example.

The member 12 and 18 are reduced in cross-section at their ends away from the pivot point 16 and the load cell 31 is mounted in such cutout portion between the members 12 and 18. The load cell is mounted so that its load measuring point will be displaced from the center line of the shaft support plane 90 by a distance $\theta$ and the load cell is attached to the lower portion 33 of the plate 12 by bolts 34, **34*a*, 34*b* which have extending portions 39 and threaded ends 41 which pass through an opening 38 in the load cell 31 so that the threaded end 41 can be received in a threaded opening in the portion 33. Washers 37 may be placed under the head of the bolts 34 as shown. An opening 36 larger than the head of the bolt 34 is formed through the portion 32 of plate 18 as illustrated for example in FIG. 3**.

A depression 42 is formed in the portion 32 of plate 18 and a bolt 43 with a shank 44 extends through an opening formed in plate portion 32 and through washers 46 and 47 and has a threaded portion 48 which is threaded into the load cell 31. The washers 46 and 47 are convex and concave, respectively, so as to allow self-centering motion between the washers 46 and 47. The load cell has downwardly extending feet portions 49 and 51 which bear on the upper surface of the portion 33 of plate 12 as shown. An electrical output terminal 52 has an electrical output 53 and is attached to the load cell 31 and is mounted in the opening 54 between the plate portions 32 and 33 as shown.

The load cell 31 may be a commerciable available load cell such as Strainsert load cell No. FL2.5U.

As illustrated in FIG. 1, the output of the load cell 31 is supplied from electrical output terminal 52 through a cable 55 to a digital converter 74 wherein the output signal is converted into a digital signal by the analog to digital converter 74. A digital filter 73 receives the output of the digital converter 74 and filters out signals generated by vibration for example. A digital to analog converter 72 receives the output of the digital filter and converts it into an infinitely variable analog signal which is supplied to a tension control 68 that moves a roller 66 that engages the web 64 through a linkage 69 to cause the shaft 67 of the roller 66 to move and thus infinitely vary the tension of the web 64 on the roller 63.

The pivot point of the member 19 is at point 16 which is reduced in cross-section to form a generally half-cylindrical-shaped surface and the shaft 62 moves on the radius R1 illustrated in FIG. 1 as the load on the roller 63 varies due to fluctuations in the web tension in the web 64. This tension is measured by the load cell 31 on the bearing point 91 which is displaced a distance $\theta$ from the center line 90 of the bearing 62 as illustrated in FIG. 1. The load on the cell 31 is measured between the plates 18 and 12 on the line 91 illustrated in FIG. 3 and this measured load is converted into the electrical signal and applied through the circuitry illustrated in FIG. 1 to the tension controller 68 to control the tension on the web 64.

It is to be realized that the load cell 31*a* is supported on a structure which is the same as that illustrated and described relative to FIGS. 3 and 4.

It is seen that this invention provides new and novel tension control and web tension load cell and although it has been described with respect to preferred embodiments, it is not to be so limited as changes and modifications may be made therein which are within the full intended scope of the invention as defined by the appended claims.

I claim as my invention:

1. Apparatus for controlling tension in a winder for paper or other web comprising, a first roller in engagement with said web to measure vertical loads, a first bearing support means rotatably supporting said first roller and formed with a horizontal surface, a base member formed with a horizontal surface, a first flexible support means having a first horizontal leg mounted to the horizontal surface of said base member and said first flexible support means having a second horizontal leg and said horizontal surface of said first bearing support means connected to said second horizontal leg, a first strain gauge load cell with one side mounted on said first horizontal leg of said first flexible support means and with its other side in contact with said second horizontal leg so as to measure vertical loads on said roller, and said first and second legs joined together by a flexible portion which has a reduced cross-section so as to allow flexure of said first and second legs, wherein said central portion has a reduced cross-section which has an opening which is semi-cylindrical in shape, wherein said load cell produces an electrical output and an infinitely variable tension control means engages said web and receives the electrical output of said load cell.

2. Apparatus according to claim 1 including a digital filter connected between said load cell and said tension control means.

3. Apparatus according to claim 1 wherein said first roller is supported on a first shaft, first and second bearings supporting opposite ends of said first shaft, said first bearing support means holding said first bearings, a second bearing support means holding said second bearing and formed with a horizontal surface, a second flexible support means having a third horizontal leg mounted to the horizontal surface of said base member, said second flexible support means having a fourth horizontal leg connected to the horizontal surface of said second bearing support means, and a second strain gauge load cell with one side mounted on said third horizontal leg of said second flexible support means and its other side in contact with said fourth horizontal leg so as to measure loads on said first roller, and said third and fourth legs joined together by a flexible portion which has a reduced cross-section so as to allow flexture of said third and fourth legs.

4. Apparatus according to claim 3 wherein said tension control means includes a second roller engageable with said web and which is supported on a second shaft and said tension control means has first and second means for moving the ends of said second shaft and said first and second strain gauges respectively supply inputs to said first and second means for moving said second shaft.

* * * * *